United States Patent [19]

Whitehurst

[11] 4,096,931

[45] Jun. 27, 1978

[54] MODULAR STEERING CLUTCH AND BRAKE PACKAGE

[75] Inventor: Gerald E. Whitehurst, East Peoria, Ill.

[73] Assignee: Caterpillar Tractor Co., Peoria, Ill.

[21] Appl. No.: 696,680

[22] Filed: Jun. 16, 1976

[51] Int. Cl.² ............................................. F16D 67/04
[52] U.S. Cl. ............................... 192/18 A; 192/13 R; 192/DIG. 1
[58] Field of Search ........... 192/110 S, DIG. 1, 18 A, 192/13 R, 18 R, 87.15, 87.16, 87.17

[56] References Cited

U.S. PATENT DOCUMENTS

| | | | |
|---|---|---|---|
| 2,741,353 | 10/1956 | Ward | 192/110 S |
| 2,903,108 | 9/1959 | Ochtman | 192/18 R |
| 3,982,618 | 9/1976 | Horsch | 192/18 A |

*Primary Examiner*—Benjamin W. Wyche

*Attorney, Agent, or Firm*—Wegner, Stellman, McCord, Wiles & Wood

[57] ABSTRACT

A modular steering clutch and brake pack for use in a vehicle power drive system. The clutch pack and brake pack comprise independent assemblies with a carrier removably disposed therebetween. The brake pack is removably bolted to a first housing and the clutch pack is removably bolted to a second housing. The brake pack includes a plurality of brake plates and the clutch pack includes a plurality of clutch plates. The carrier further defines a mandrel for maintaining alignment of the brake plates and the clutch plates during adjustment thereof in the make-up of the clutch and brake assembly. Suitable bearings are provided on the carrier for journaling the brake pack and clutch pack. The carrier may be splined to selected plates of the brake pack and clutch pack and to the output shaft of the power drive system.

12 Claims, 3 Drawing Figures

MODULAR STEERING CLUTCH AND BRAKE PACKAGE

BACKGROUND OF THE INVENTION

1. Field of the Invention

This invention relates to power drive systems and in particular to clutch and brake assemblies for use therein.

2. Description of the Prior Art

In one improved final drive assembly for a track-type vehicle disclosed in U.S. Pat. No. 3,771,627, of Samuel I. Caldwell et al., which patent is owned by the assignee hereof, a modular parking brake assembly is detachably mounted between a hydrostatic drive motor and a speed reduction gear train of the final drive. The parking brake assembly includes separable brake amd brake actuating modules mounted in a housing for facilitated assembly and servicing.

Robert S. Root, in U.S. Pat. No. 3,157,257 shows a clutch and brake package removable as a unit from a drive assembly.

Rowland Jewson, in U.S. Pat. No. 3,177,994, shows a fluid-actuated clutch and brake which is arranged to be readily dismantled for replacement of parts or other repairs. The assembly may be withdrawn completely from an outer housing as a unit and may be further disassembled to gain access to individual components in the servicing thereof.

William E. Lewis, et al., in U.S. Pat. No. 3,638,773, disclose a clutch brake unit including a clutch disk pack, a brake disk pack, and an interposed piston unit which is coupled in one direction to engage a clutch and in the opposite direction to engage the brake. The housing is formed in three major sections including an input section generally enclosing the input shaft and the clutch pack. An output section of the housing generally encloses the output shaft and the brake pack. An intermediate section of the housing generally contains the piston unit. Either of the cutch pack or brake pack may be removed as for servicing while maintaining the integrity of the piston unit, or alternatively, the piston housing can be removed in its entirety for servicing of the piston unit independently of the brake and clutch units.

SUMMARY OF THE INVENTION

The present invention comprehends an improved clutch and brake assembly for use in a power drive system wherein a carrier is interposed between the brake pack and clutch pack. Improved securing means comprising bolt means are provided to permit ready removal of either the brake pack or clutch pack from the assembly for servicing thereof when desired. The carrier defines a mandrel for maintaining alignment of the brake plates and clutch plates of the brake and clutch packs, respectively, during adjustment thereof by adjusting means provided in association with the brake and clutch packs.

Additionally, the carrier is provided with bearing means for journaling the brake pack and clutch pack for improved cooperative mounting of the assembly elements.

The carrier may be splined to the output drive shaft. Further, the carrier may be splined to a number of the plates of the brake pack and the number of the plates of the clutch pack. In the illustrated embodiment, the carrier defines an outer spline which is splined to plates of both the brake pack and clutch pack.

Bolt means may be provided for retaining the bearing means in association with the carrier in the assembly of the unit, while permitting facilitated disassembly for servicing of different portions of the unit as described above.

Thus, the clutch and brake assembly of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
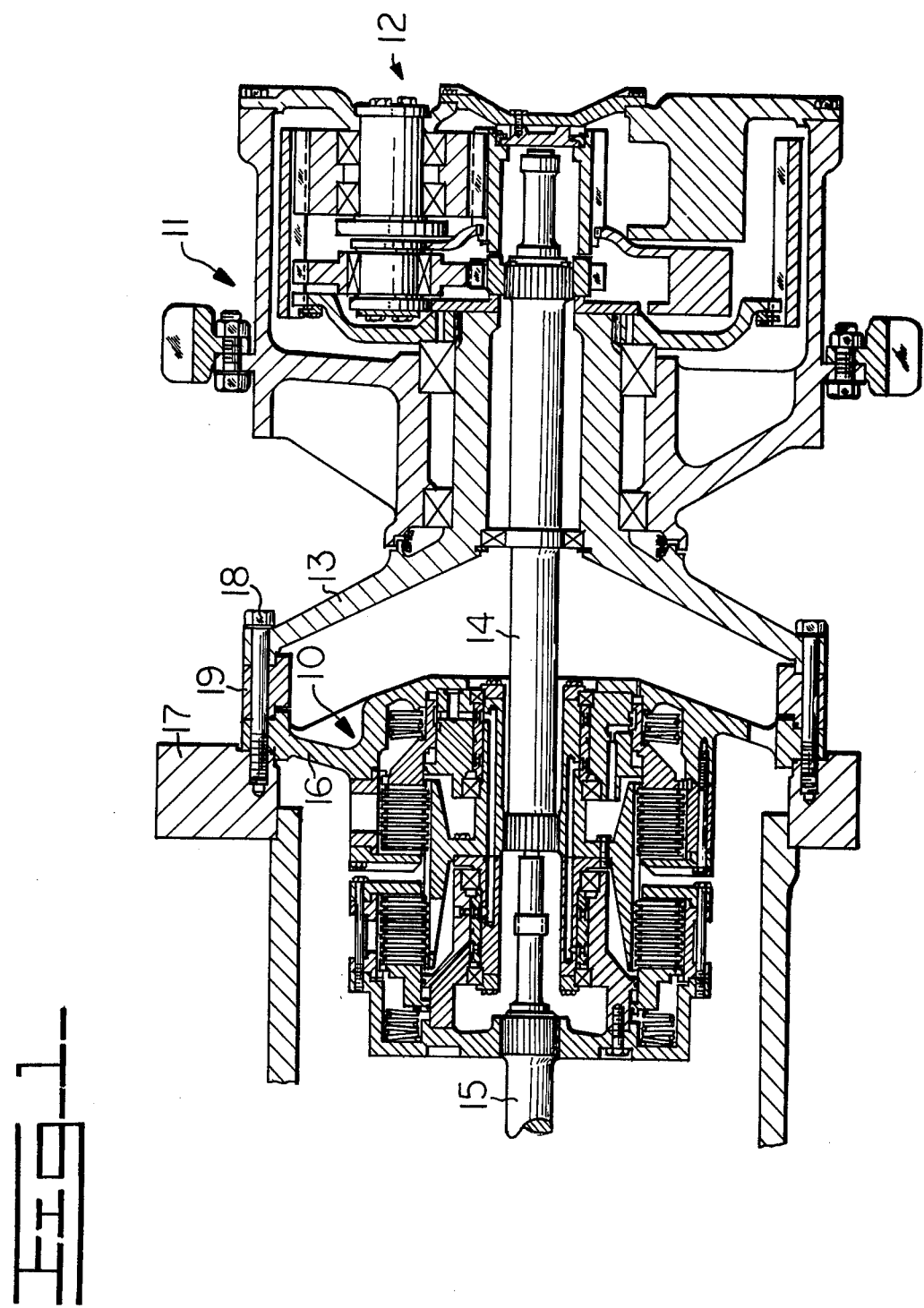
FIG. 1 is a diametric section of a power drive system having a clutch and brake assembly embodying the invention.

In the exemplary embodiment of the invention as disclosed in the drawing, a clutch and brake assembly generally designated 10 is provided for use in a power drive system generally designated 11 including a final drive portion generally designated 12 carried by a housing 13. The final drive includes an output shaft 14 which is driven from an input shaft 15 through the clutch and brake assembly 10.

As best seen in FIG. 1, assembly 10 is carried by a first brake pack housing 16 which, in turn, is secured to a mounting support, or bevel gear case, 17 by suitable securing means, such as bolts 18. Bolts 18 further secure the final drive housing 13 to the brake housing 16 and bevel gear case 17 through spacers 19.

Figure 3:
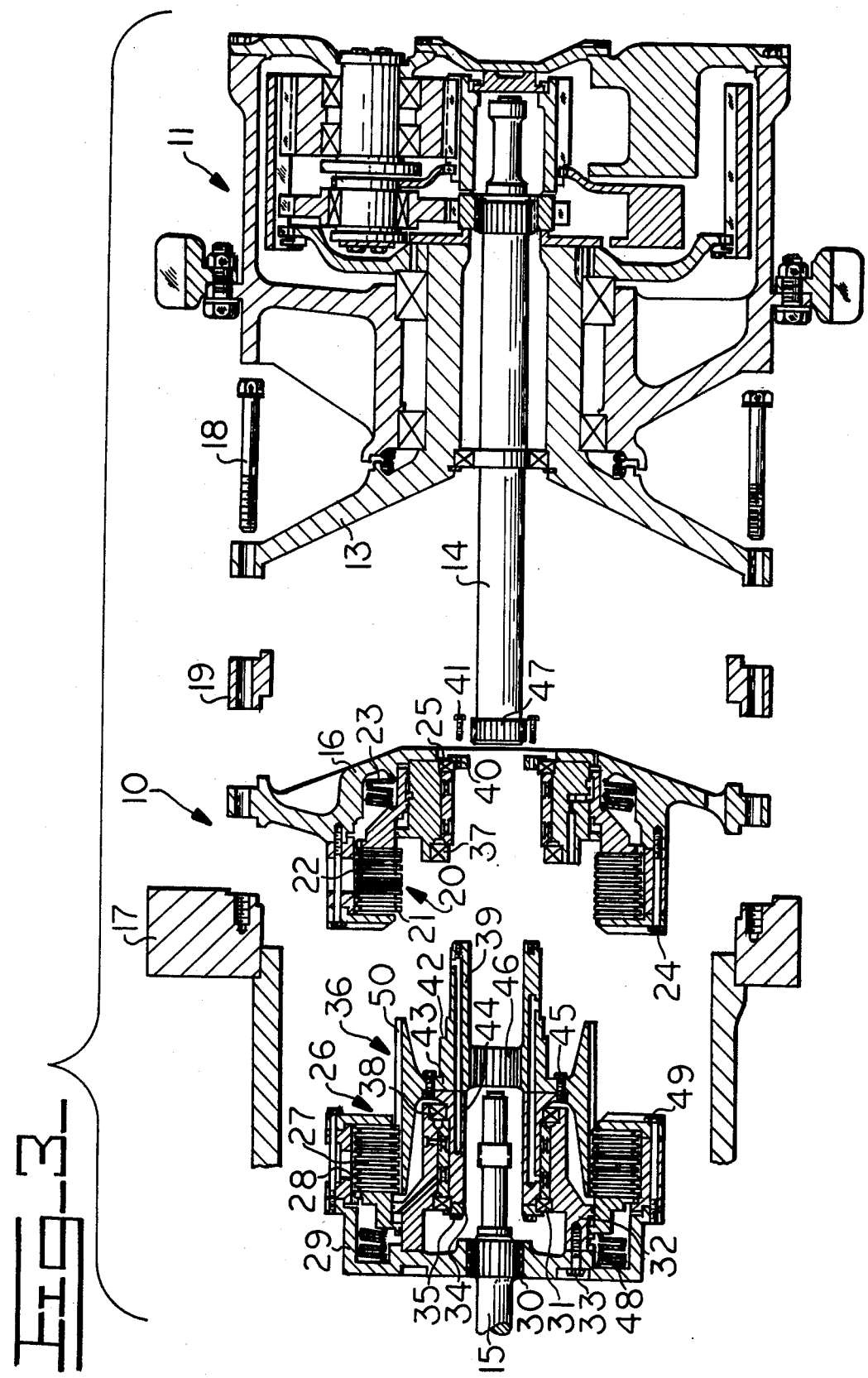
FIG. 3 is a diametric section thereof with the clutch pack and carrier removed from the brake pack.

As best seen in FIG. 3, assembly 10 includes a brake pack generally designated 20 carried by brake housing 16. The brake pack includes a plurality of brake plates comprising alternately internally splined plates 21 and externally splined plates 22. A Belleville spring 23 is provided for biasing the brake plates and first bolt means 24 are provided for securing brake pack 20 in the housing 16 and maintaining a predetermined biasing force of the Belleville spring. The externally splined plates 22 are splined to the housing 16. The brake pack is further provided with suitable bearings 25.

Assembly 10 further includes a clutch pack generally designated 26 having a plurality of internally splined clutch plates 27 alternating with a plurality of externally splined clutch plates 28. The externally splined plates 28 are splined to a second housing 29 which houses the clutch pack and which, in turn, is splined at 30 to the input shaft 15.

The clutch pack further includes bearing means 31 carried on an annular member 32 secured to the housing 29 by a suitable securing means, such as bolt means, i.e. bolts 33. The bearing means 31 are retained to the member 32 by a retainer 34 and suitable removing securing means, such as bolts 35.

The assembly 10 further includes a carrier generally designated 36 extending between the brake pack and the clutch pack and carrying a first bearing means 37 for rotatably supporting the brake pack, and a second bearing means 38 for rotatably supporting the clutch pack.

The carrier 36 includes an annular inner portion 39. Bearing means 25 are retained in association with the clutch pack by a retainer 40 secured to the carrier portion 39 by suitable removable securing means, such as bolts 41. Inner portion 39 further defines a shoulder 42 which engages the bearing means 37 to retain the bearing means 37 in place on the carrier and disposed to journal the brake pack 20, as a result of the securing of retainer 40 by bolts 41.

Carrier 36 further defines an intermediate portion 43 which is removably secured to a retainer 44 by suitable removable securing means, such as bolts 45. Bolts 35 are adapted to engage retainer 44 in holding retainer 34 suitably to retain bearing means 31.

Carrier 36 further defines a radially inwardly projecting spline 46 engaging a spline 47 on output shaft 14, and a radially outer spline 50 adapted to engage the internally splined plates 21 of the brake pack and internally splined plates 27 of the clutch pack.

Clutch pack 26 further includes a Belleville spring 48 for biasing the plates 27 and 28 thereof and second bolt means 49 for maintaining securing the clutch pack 26 in housing 29 and a predetermined biasing force of the spring 48.

Figure 2:
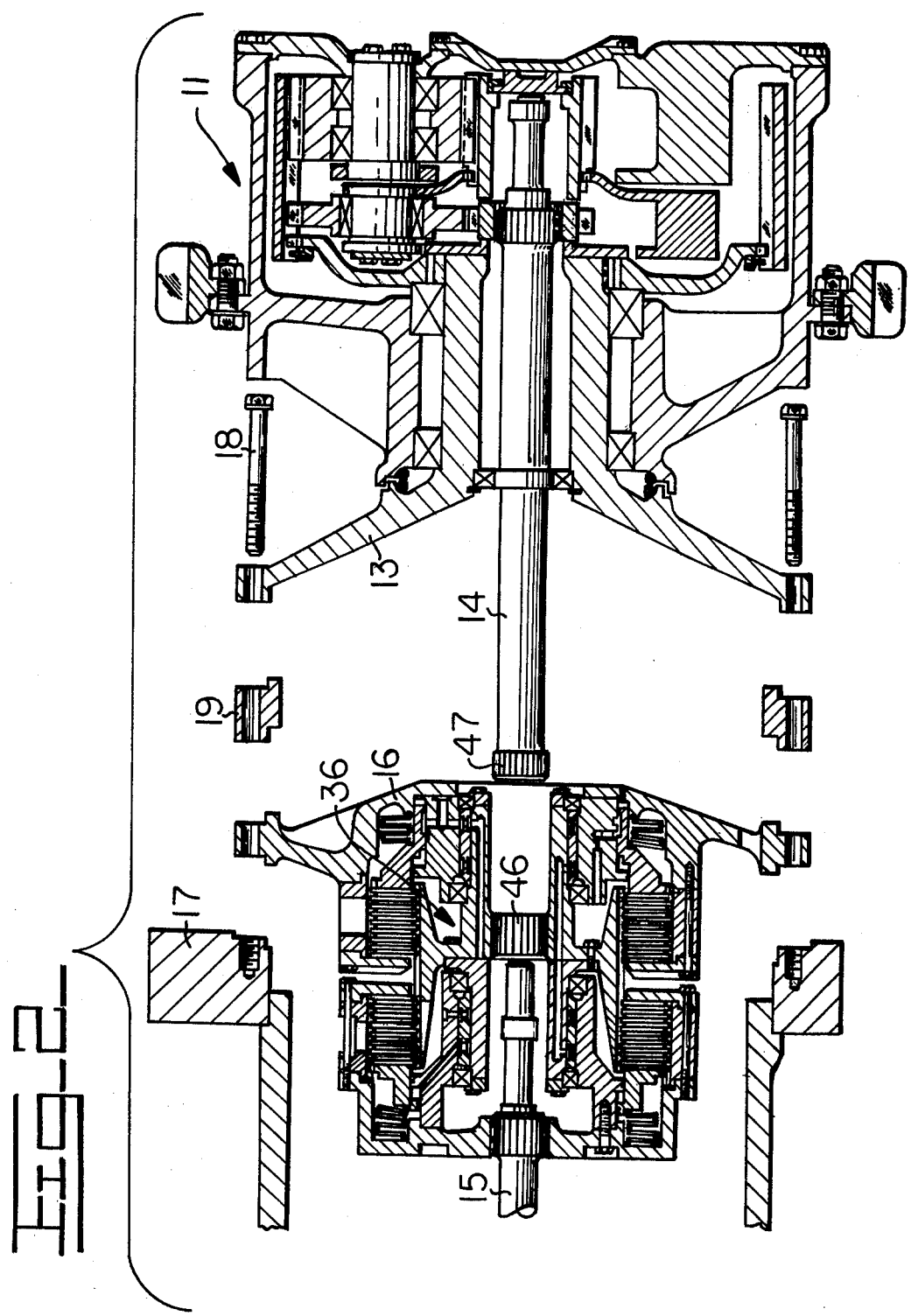
FIG. 2 is a diametric section similar to that of FIG. 1 but with the clutch and brake assembly removed from the final drive housing.

As best seen in FIG. 3, bolts, 18, 41, and 45 define a third bolt means for mounting the clutch and brake assembly as a unit to the support 17. Thus, upon removal of bolts 18 the brake pack 20 and clutch pack 26 may be removed from the assembly as a unit, as shown in FIG. 2. The brake pack-clutch pack unit may be separated if desired by removal of bolts 41 to permit servicing of the brake and clutch packs individually. Thus, as further shown in FIG. 3, the brake pack may be serviced by removal of the bolts 24, which may be gradually loosened so as to permit the Belleville spring 23 to become unloaded whereupon facilitated disassembly of the brake pack may be effected.

When removal of clutch plates 27 and 28 is required, bolt 49 may be removed to provide access to the clutch plates. If further disassembly is required, bolts 33 may be removed to free annular member 32 from housing 29. Upon removal of member 32, access is provided to bolts 35 to release bearing retainer 34 from retainer 44. Bolts 49 may be gradually unthreaded so as to gradually reduce the force of Belleville spring means 48 to permit the complete disassembly of the clutch pack when desired.

When it is desired to reassemble the unit 10, the carrier spline 50 serves as a mandrel for maintaining alignment of the brake plates and clutch plates 21,22 and 27,28, respectively. Thus, the first and second bolt means 24 and 49 may be gradually tightened to load up the Belleville springs 23 and 48, respectively, eliminating the need of a press to reassemble the brake and clutch packs in the field.

As each of the brake and clutch packs comprises a separate unit, replacement units may be quickly and easily substituted for either of the packs, permitting servicing of a removed unit with minimum down time of the vehicle.

Thus, the clutch and brake assembly of the present invention is extremely simple and economical of construction while yet providing facilitated servicing of the assembly when desired. The improved carrier structure of the present invention, in providing a mandrel for the automatic alignment of the internally splined brake and clutch plates, provides a facilitated adjustment of the spring biasing pressure of the brake and clutch packs without the need for expensive press equipment and the like. The use of bolt means for securing bearing retainers to provide ready disassembly and assembly of the unit provides further facilitated servicing at minimum structural cost.

The foregoing disclosure of specific embodiments is illustrative of the broad inventive concepts comprehended by the invention.

What is claimed is:

1. A clutch and brake assembly for use in a power drive system having a mounting support, comprising: a first housing; a brake pack having a plurality of brake plates; first biasing means for providing a predetermined adjustable bias of said brake plates; first bolt means removably securing said brake pack in said first housing to define a brake assembly; a second housing; a clutch pack having a plurality of clutch plates; second biasing means for providing a predetermined bias of said clutch plates; second bolt means removably securing said clutch pack in said second housing to define a clutch assembly; a carrier defining a mandrel for maintaining the alignment of said brake plates and said clutch plates during adjustment of the bias thereof by said first and second biasing means; and third bolt means for mounting the clutch and brake assemblies as a unit to said mounting support whereby said clutch and brake assemblies may be removed as separate assembled units from the support for servicing of either when desired without disassembly of the other.

2. The clutch and brake assembly of claim 1 including bearing means on said carrier journaling said brake pack and clutch pack.

3. The clutch and brake assembly of claim 1 wherein said carrier defines spline means engaging said brake plates and clutch plates for maintaining said alignment.

4. The clutch and brake assembly of claim 1 including bearing means on said carrier journaling said brake pack and clutch pack, and said third bolt means further defines means for removably retaining said bearing means on said carrier.

5. The clutch and brake assembly of claim 1 wherein said first biasing means includes spring means for biasing said brake plates and said first bolt means comprises removable means for maintaining a predetermined biasing force of said spring means.

6. The clutch and brake assembly of claim 1 wherein said second biasing means includes spring means for biasing said clutch plates and said second bolt means comprises removable means for maintaining a predetermined biasing force of said spring means.

7. A clutch and brake assembly for use in a power drive system having a mounting support and an output shaft, comprising: a first housing; a brake pack having a plurality of brake plates; first biasing means for providing a predetermined adjustable bias of said brake plates; first bolt means removably securing said brake pack in said first housing to define a brake assembly; a second housing; a clutch pack having a plurality of clutch plates; second biasing means for providing a predetermined bias of said clutch plates; second bolt means removably securing said clutch pack in said second housing to define a clutch assembly; a carrier carried on said output shaft and defining both biasing support means and a mandrel for guiding a portion of said brake plates and said clutch plates into assembled relationship in said packs during assembly thereof; bearing means for journaling each of said brake pack and said clutch pack on said carrier; and third bolt means for mounting the clutch and brake assemblies as a unit to said mounting support whereby said clutch and brake assemblies may be removed as separate assembled units from the support for servicing of either when desired without disassembly of the other.

8. The clutch and brake assembly of claim 7 wherein said carrier is splined to the output shaft.

9. The clutch and brake assembly of claim 7 wherein said portion of the brake pack plates include inner teeth splined to said carrier.

10. The clutch and brake assembly of claim 7 wherein said portion of the clutch pack plates have inner teeth splined to said carrier.

11. The clutch and brake assembly of claim 7 wherein said carrier includes a spline and each of said brake and clutch plate portions are splined to said carrier spline.

12. The clutch and brake assembly of claim 7 wherein said carrier includes a radially inner spline splined to said output shaft and a radially outer spline means, said brake and clutch plate portions being splined to said outer spline means.

* * * * *